May 23, 1950     D. L. McFARLAND     2,509,008
CONTROL FOR ELECTRIC WATER KETTLES
Filed Oct. 25, 1949
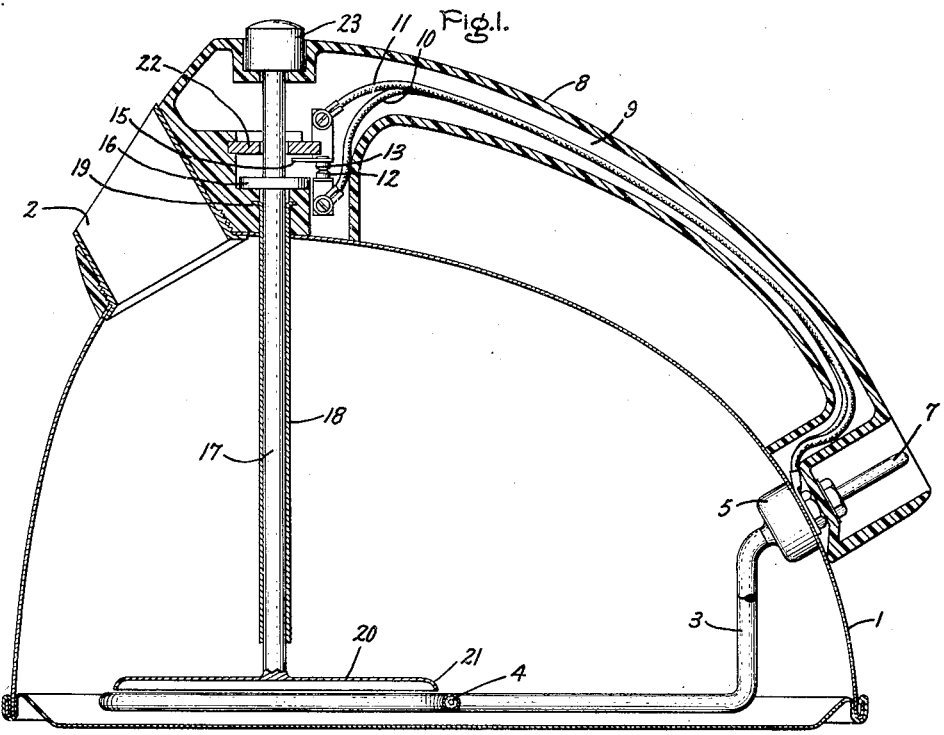
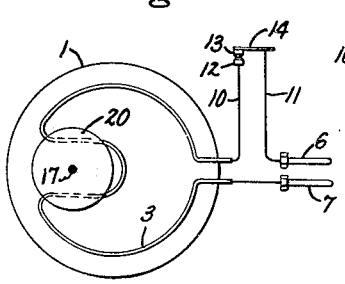 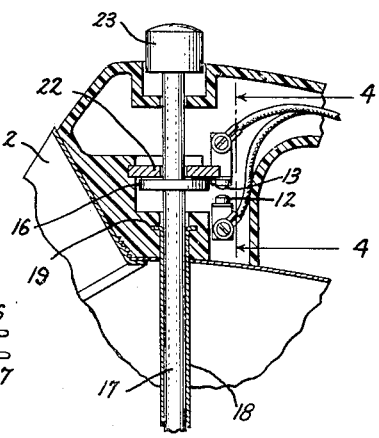 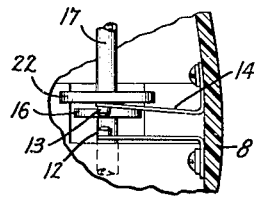
Inventor:
Donald L. McFarland,
by *Merridanlebeggs*
His Attorney.

Patented May 23, 1950

2,509,008

UNITED STATES PATENT OFFICE 2,509,008

CONTROL FOR ELECTRIC WATER KETTLES

Donald L. McFarland, Monroe, Conn., assignor to General Electric Company, a corporation of New York Application October 25, 1949, Serial No. 123,450

4 Claims. (Cl. 219—44)

1

This invention relates to electrically heated kettles or similar vessels for warming water or other liquids. More particularly, the invention relates to a control for such a kettle which will interrupt the current to the heating element of the kettle when the water in it boils. Specifically, my invention is concerned with a simplified control arrangement, the major electrical elements of which are housed within the handle of the kettle.

In electric water heating kettles or similar vessels, one of the difficulties in use is the fact that if the water should boil dry from the kettle the heating element in the kettle becomes overheated and is damaged or destroyed. This would necessitate major repairs to the vessel because the heating element is built in as a part of the vessel. The primary object of the invention is to provide a control arrangement which is built in as a part of the kettle and which will shut off power to the kettle heater whenever the water in the kettle boils. If thereafter it is wished again to start heating water, a positive operation of a knob or button must be made before the circuit is again established.

Other objects and the details of that which I believe to be novel and my invention will be clear from the following description and claims taken with the accompanying drawings in which is illustrated an example of a water kettle embodying the present invention and incorporating my improved control for the heating element.

In the drawings Fig. 1 is a sectional side view of a water kettle according to my invention, showing the control contacts in closed circuit position; Fig. 2 is a fragmentary view of a portion of Fig. 1 showing the control contacts in open circuit position; Fig. 3 is a diagrammatic plan view of the kettle of Fig. 1 showing the control circuit and general shape of the heating element and its relation with respect to the control operating disc, and Fig. 4 is a fragmentary section on the line 4—4 of Fig. 2 showing the contacts.

A kettle according to my invention includes a body 1 with a bottom and side walls, having a pouring and filling spout 2 secured thereto in suitable fashion. Inside of the kettle is a sheathed coiled wire heating element 3 of a well known type which need not be further described excepting to note that the resistance wire element 4 inside of the sheath is electrically insulated from the sheath and the sheath provides a waterproof but heat conducting covering for the resistance wire. The sheath of the heating element is sealed to the water kettle at the point marked 5, but the two ends of the resistance wire are passed through the walls of the kettle and are electrically connected, as described below, to power plug terminals 6 and 7, only one of which is shown in Fig. 1. The heating element may take the shape shown in Fig. 3 for purposes

2 which will later appear, and extends horizontally near the bottom of the kettle, as seen in Fig. 1.

On the top of the kettle I provide a hollow handle 8 of some suitable plastic material such as a phenolic condensation product. I have shown this handle as extending between the spout 2 and the plug terminals 6 and 7 and providing protective cavities in its ends for the spout and the terminals.

Housed within the hollow portion 9 of the handle are conducting wire 10 and 11 which lead respectively from one of the plug terminals 6 to a control switch and from the other side of the control switch to the corresponding end of the resistance wire 4. This connection is shown diagrammatically in Fig. 3. The other end of the resistance wire is directly connected to plug terminal 7.

The control switch comprises a stationary contact 12 suitably secured within the hollow handle, and a movable contact 13 also housed within the handle cavity but movable with respect to the contact 12. The movable mounting of the contact 13 may be accomplished in any desired manner although I have shown simply a resilient L-shaped contact arm 14 which serves both as a connection post for the wire 11 and as a movable support for the contact 13. The arm 14 is suitably secured inside the handle cavity as shown best in Fig. 4. Extending sidewise from this contact arm is a leg or extension 15 which is used to open the contacts through movement of the parts of the control mechanism about to be described. The arm 14 is made to have a slight resilient bias in a downward direction so that if it is not lifted by the leg 15 it will drop and hold the contact 13 closed against the contact 12.

The leg 15 is raised to open the circuit through the contacts 12 and 13 by movement of a magnetic contact lifting member shown in the form of a disc 16 secured to a vertical shaft or rod 17. This shaft 17 is slidably mounted within a guiding tube 18 which in turn is secured to the body of the kettle in any suitable fashion, and may be fastened within the handle as by the turned flange 19. The rod 17 is moved upwardly upon movement of the horizontal actuator disc 20 which is secured to the bottom end of the shaft, and which has down-turned edges 21 which produce a sort of inverted dish shape. This actuator disc is normally near the bottom of the kettle, so that when water is heated to the boiling point by the heating element 3 in the bottom of the kettle, the force of the boiling will tend to lift the disc, and raise the rod or shaft 17 and the contact lifting member 16 to open the contacts. The leg 15 on the contact arm 14 is of course in the path of movement of the lifting member 16.

In order to complete the upward movement of the rod and to hold the contacts in their open positions after the water has once started to boil, the contact lifting member 16 is made to cooperate with a magnetic holding member 22 so that when once the shaft has been raised it will be held in raised position until an operator pushes downwardly on the reset button 23 which is located outside the handle at the top end of the shaft. In order to accomplish this desired effect, either the lifting member 16 or the holding member 22 or both of them may be a permanent magnet. If only one of them is a magnet, then the other one will of course be made of iron or some other material which will serve as a "keeper" for the magnet member. The member 22 is suitably secured in a stationary position in the hollow portion of the handle so that it will be in the path of movement of the member 16. When the two members are moved closely together, as by raising of the disc 20 upon boiling within the kettle, the member 16 will strike the arm 15 and raise the contact 13, thereby interrupting the circuit through the heating element. Mutual attraction of the magnetic members will hold the contacts apart. When it is desired to start operation of the heating element again all that is necessary is to press the button 23, and the circuit will be restored.

It will be seen that I have provided a simple, inexpensive arrangement for controlling the circuit to an electrically heated water kettle and as will be evident from the foregoing description, certain aspects of my invention are not limited to the particular details of construction of the example illustrated, and I contemplate that various and other modifications and applications of the invention will occur to those skilled in the art. It is therefore my intention that the appended claims shall cover such modifications and applications as do not depart from the true spirit and scope of my invention.

What I claim as new and desire to secure by Letters Patent of the United States is:

1. In an electric water kettle having a heating element, power terminals therefor, a control circuit between one end of the element and one of the terminals, and a pair of mutually cooperating contacts in said circuit, one of which is movable to open and close the circuit through the heating element, that improvement in a control for said contacts which comprises a horizontal actuator disc in said kettle, a vertical rod carrying said disc at one end and slidably mounted with respect to said kettle, means biasing said movable contact toward circuit closing position, and magnetic means overcoming said biasing means and holding the circuit open when said disc is raised by boiling in the kettle, said magnetic means comprising a first magnetic member carried by said rod, and a cooperating stationary magnetic member carried by the kettle, said magnetic members being brought into mutually attracting relation upon lifting of the disc due to boiling in the kettle to open the circuit to the heating element.

2. In an electric water kettle of the type including a vessel with bottom and side walls, a heating element in the bottom thereof, power terminals for the heating element, a control circuit between one end of the element and one of the terminals, and a pair of mutually cooperating contacts in said circuit, one of which is movable to open and close the circuit through the heating element, that improvement in a control for said contacts which comprises a horizontal inverted dish shaped actuator disc in said vessel above the heating element, a vertical rod carrying said disc at one end and slidably mounted through a wall of the vessel, a reset button on the other end of said rod, a spring arm carrying and biasing said movable contact toward circuit closing position, and magnetic means engaging and overcoming the bias of said spring arm and holding the circuit open when said disc is raised by boiling in the vessel, said magnetic means comprising a first magnetic member carried by said rod, and a cooperating stationary magnetic member carried by the kettle, said magnetic members being brought into mutually attracting relation upon lifting of the disc due to boiling in the kettle to open the circuit to the heating element.

3. An electric water kettle comprising a vessel body, a horizontal heating element in the bottom of the vessel body, power plug terminals on the outside of the body, a spout providing a passage to the inside of the body, a hollow handle extending between and housing said terminals and said spout, a first contact in the handle, a second movable contact in the handle adapted to cooperate with said first contact to make and break a circuit thereto, a first conductor in the handle establishing connection between one of said plug terminals and one of said contacts, a second conductor in the handle establishing connection between the other of said contacts and an end of the heating element, a horizontal actuator disc in the vessel body above the heating element, a vertical rod carrying said disc at its lower end, slidable longitudinally through the handle near the spout and extending to the outside of the vessel body and handle, a reset button on the upper end of said rod, means normally biasing said movable contact toward circuit making position with said first contact, a first magnetic member fixed to the rod inside the handle, a cooperating second magnetic member fixed inside the handle, said magnetic members having sufficient mutual attraction when brought close together to hold themselves together and to overcome the force of said contact biasing means and the weight of said disc and shaft, said first magnetic member adapted to engage and lift said movable contact when said rod is lifted by the boiling of water under said actuator disc.

4. A control for an electric liquid heating vessel of the type having a body for containing the liquid to be heated, an electrical resistance element in the vessel, and a handle secured on top of the vessel, said control comprising, a vertical rod in the vessel body extending through and outside of the handle, means mounting said rod for longitudinal sliding movement between a lowered and a raised position, an actuator disc on the lower end of said rod inside of the vessel body above the resistance element, a stationary contact in the handle, a cooperating movable contact in the handle, a lifting member secured to said rod and movable therewith, an extension from said movable contact located in the path of movement of said lifting member, said extension being engaged and said contact being moved by said lifting member when said member is raised by said rod, a holding member cooperating with said lifting member to hold said rod and attached parts when in raised position, said lifting and holding members being one a permanent magnet and the other a keeper for the magnet member, and power circuit connections to the resistance element through said contacts, whereby opening of said contacts will interrupt power to the resistance element.

DONALD L. McFARLAND.

No references cited.